United States Patent Office 3,407,829
Patented Oct. 29, 1968

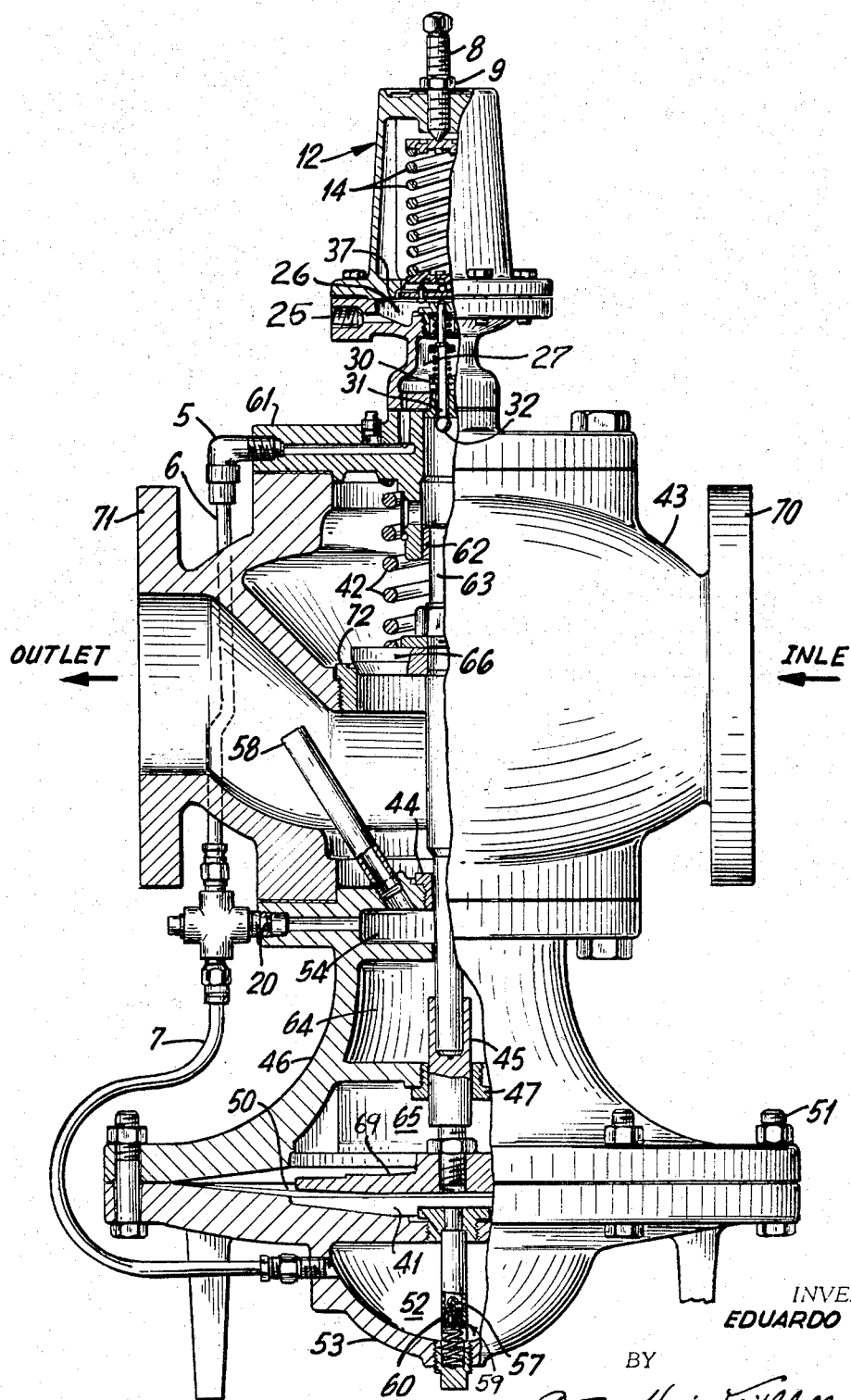

3,407,829
DIAPHRAGM ACTUATED CONTROL VALVE
Eduardo L. Cusi, Bethlehem, Pa., assignor to Sarco Company, Inc., Allentown, Pa., a corporation of New York
Filed Mar. 15, 1966, Ser. No. 534,480
5 Claims. (Cl. 137—154)

ABSTRACT OF THE DISCLOSURE

A diaphragm actuated valve which operates in response to a pressure signal is constructed to provide for an actuating liquid in communication with the diaphragm to reduce actuation response time and to reduce instability.

---

This invention relates to improvements in gas operated diaphragm valves for controlling the flow of fluids and, more particularly, for application to condensable fluids such as steam, ammonia, etc.

Diaphragm operated valves are used to control flow or pressure in response to an information signal which is in the form of a fluid pressure. Valves of this type are disclosed in Patents Nos. 3,099,431 and 3,102,232, assigned to the assigneee of the present invention, wherein the valves are shown as having a main valve housing containing a valve head and cooperating seat which separate the upstream inlet from the downstream outlet of the valve. The valve head is provided with a valve stem which extends through a guide to a valve actuating unit. The valve stem is connected to a diaphragm within the actuating unit which diaphragm moves under the influence of differential pressure to control the position of the valve head with respect to the valve seat. The diaphragm is affixed at its periphery to the wall of the actuating unit such that the diaphragm divides that unit into two pressure chambers. A change in the pressure in one of the chambers results in a differential pressure between these chambers which causes the diaphragm to move, thereby displacing the valve stem to drive the valve head to a new position with respect to the seat. A pilot alve is conventionally employed to modify the pressure differential in the main valve diaphragm chambers by controlling the pressure in one of the chambers. The pilot valve comprises diaphragm which moves in response to a signal pressure input. A change in the signal pressure causes the pilot valve diaphragm to move, thereby controlling the admission of fluid from the upstream side of the main valve through the pilot valve and through a control pipe to actuate the main valve operating diaphragm.

When such a diaphragm operated valve is used to regulate pressure in a steam line, an increase in steam usage on the downstream side of the valve will cause a reduction in pressure on that side of the main valve. The signal pressure input to the pilot valve is derived from this side and thus the pressure on the pilot valve diaphragm is reduced. The pilot valve diaphragm will then move to admit steam from the upstream side of the main valve through the control pipe to the main valve operating diaphragm. The increase of pressure thus obtained on the main diaphragm causes the diaphragm to move the valve stem, thereby further opening the clearance between the valve head and its seat. The flow of steam through the main valve thus increases to supply the increase in demand.

The steam that actuates the main valve diaphragm must travel through relatively small orifices in order to reduce instability and "hunting." These orifices restrict the flow rate of the actuating steam. The actuating steam condenses upon reaching the main diaphragm chamber, thus requiring considerable quantity of steam to flow through the control pipes and orifices into the diaphragm chamber before any appreciable differential pressure is experienced by the diaphragm. Under normal operating conditions approximately thirty volumes of steam are required to make up for each volume of water condensed out of the steam. The response of such conventional control valves is slow, and such valves require a period of time on the order of fifteen minutes to fully respond to a control signal. Because of the condensation of the actuating steam, conventional valves are inclined to be unstable. Where such a valve is used to regulate steam pressure, the valve will alternatively supply too much and then too little steam until it eventually settles to an equilibrium state. It is apparent that close control over fluctuating steam requirements is difficult to obtain with such control valves.

The diaphragm is in direct contact with steam and requires frequent replacement due to the high temperature environment and the corrosive nature of steam.

Accordingly, it is an objective of the present invention to provide a control valve which is rapid in its response to a change in conditions, relatively free from instability, and less subject to corrosion.

The present invention provides a structure for a diaphragm operated control valve which utilizes liquid as the actuating medium. Actuating fluid supplied via the pilot valve is permitted to condense in the diaphragm chambers until such chambers are filled with condensate liquid. The change in volume in the diaphragm chamber is thus accomplished by the addition or removal of a small quantity of liquid. The diaphragm chambers may be pre-filled with any suitable non-corrosive liquid in lieu of condensate. The valve of the present invention may thus be used to control a non-condensable gas.

Since the diaphragm is immersed in a liquid, it is no longer subject to the severely corrosive environment of condensing steam.

Referring now to the drawing, an operative embodiment of the present invention will be described. The illustrated embodiment is a steam pressure regulating valve.

A main valve body housing 43 is divided into inlet and outlet sections which are terminated in conventional pipe flanges 70 and 71 which mate with appropriate steam pipes. Flow between the inlet and outlet sides of the valve is controlled by valve head 66 which fits valve seat 72. The valve head 66 is affixed to a valve stem 63, which passes through valve stem guides 44 and 62. A spring 42 biases the valve head 66 toward closure with the valve seat 72.

Atop the main valve bonnet 61 is a pilot valve assembly 12. The pilot valve assembly 12 is comprised of a diaphragm 37 which is biased by a spring 14. The force exerted by the spring 14 is adjustable by means of a set screw 8 and lock nut 9. The pilot valve diaphragm 37 bears against a pilot valve stem 31. The pilot valve stem 31 is movable within a guide 30 with sufficient clearance to permit the flow of steam past the valve ball 32 into chamber 27. The information input signal to the pilot valve is in the form of a fluid under pressure admitted to diaphragm chamber 26 through an appropriate connection 25. Such pressure may be derived directly from the downstream side of the main valve in the case of a regulating valve, or may be supplied from an external source such as a fluid control system in the case of a remotely controlled valve, or may be from a transducer such as a temperature probe whose information output is in the form of fluid pressure. Alternatively, an information source or transducer whose output is in the form of motion may be used to act directly on the pilot valve stem 31 without the need for a pilot valve diaphragm 37. Steam from the upstream or inlet side of the valve in a quantity controlled by the pilot valve is admitted to the pilot valve chamber 27. Chamber 27 is in communication with control pipes 5, 6, and 7 which lead to the main diaphragm housing.

Below the main valve body is the control diaphragm housing which is comprised of members 46 and 53. Separating members 46 and 53 is the main control diaphragm 50. Diaphragm 50 acts against a plate 69 which is affixed to the valve stem 63 by means of a coupling 45.

The lower housing member 53 an the lower side of the diaphragm contains two chambers 52 and 41. The actuating members 46 and 53 clamp the periphery of the diaphragm 50 and are joined by bolts 51.

The lower housing member 53 on the lower side of the diaphragm contains two chambers 52 and 41. The actuating steam pipes 5, 6, and 7 lead to the lower chamber 52. Steam traveling through these pipes creates a pressure head over the condensed water present in chamber 52. An orifice at the foot of pipe 60 allows only water to ascend pipe 60 to supply chamber 41 with water. The orifice 59 is provided with a loose fitting wire member 57 which serves to prevent clogging of the orifice. Wire member 57 randomly vibrates or rattles within the orifice as liquid flows past the wire. The orifice is thereby kept free of material which otherwise would clog the orifice. Thus chamber 41 contains only water. No steam is permitted to enter chamber 41. The liquid capacity of chamber 52 must be great enough to accommodate the change in volume of chamber 41 as the diaphragm moves the valve head 66 to its fully open position. The surface area of chamber 52 is minimized to reduce condensation. The quantity of steam needed to effect diaphragm actuation is reduced.

Upper member 46 contains a plurality of chambers 54, 64, and 65. Steam from the downstream side of the main valve passes through the clearance between valve guide 44 and valve stem 63 and through standpipe 58 into chamber 54. Chamber 54 removes any velocity component from the steam in the manner taught in U.S. Patent No. 3,103,232, thereby insuring that the steam pressure in chamber 54 is entirely static pressure. Steam from chamber 54 passes through the relative large clearance between the valve stem and the housing into chamber 64 in which it condenses. The condensate then passes through the clearance between guide 47 and valve stem coupling 45 into chamber 65 which chamber is in communication with the diaphragm 50. Chamber 65 is completely filled with water. Both sides of the diaphragm 50 are thus isolated from direct contact with steam. Chambers 52 and 64 serve as reservoirs for water to insure and adequate supply of water for diaphragm actuating chambers 41 and 65. The clearance in the guide 47 damps out instability.

Actuating steam in excess of that required by chamber 52 is vented through orifice 20 between control pipe 6 and control pipe 7. This excess steam enters chamber 54 and is exhausted to the downstream side of the valve through a standpipe 58.

The operation of the valve of the present invention will be described with the example being a steam pressure regulating valve. As the demand for steam on the downstream side of the main valve increases, the pressure on this side drops. A small sensing pipe is connected between the downstream side of the main valve and the pressure information port 25 in the pilot valve 12. The drop in pressure is reflected as a drop in pressure in a pilot valve chamber 26. The reduced pressure acting on the pilot valve diaphragm 37 permits it to be urged downwardly by the biasing spring 14 until a new equilibrium position is reached or until the diaphragm 37 is fully extended. Downward movement of diaphragm 37 causes pivot valve stem 31 to unseat pilot valve ball 32 thereby establishing a path for steam from the upstream or inlet side of the valve to enter chamber 27. Steam under pressure passes through chamber 27 and into the control lines 5, 6, and 7. This actuating steam appears in chamber 52 below the main diaphragm 50. Since chamber 52 is substantially filled with condensed water from steam, the increase in pressure in chamber 52 causes that water to pass through orifice 59 and to ascend pipe 60 to increase the quantity of water in chamber 41. The increase in pressure on the water in chamber 41 acts against diaphragm 50 and causes the diaphragm to move upwardly carrying with it the valve stem 63. This upward motion of valve stem 63 will continue until the force on the lower face of the diaphragm is equal to the force on the upper face. The force on the upper face is the sum of the bias of main spring 42, the pressure acting on the valve head 66, and the force due to the downstream stem pressure acting on the upper face of the diaphragm in chamber 65. When equilibrium is established, the valve head 66 will cease movement at a position further open than its initial position.

Since the mass flow rate of water passing through the orifice 59 is about thirty times as great as the mass flow rate of steam through a similar orifice, the volume change in diaphragm chamber 41 will occur many times faster than can be expected with a diaphragm directly acted upon by steam. Thus, the valve of the present invention rapidly achieves a new equilibrium.

When the demand for steam on the downstream or outlet side of the valve decreases, the pressure in the downstream steam line increases. This increased pressure is sensed by the pilot valve 12 and causes it to reduce or terminate the flow of actuating steam through the control pipes. This reflects as a reduction in pressure in chambers 52 and 41. Additionally, the increased pressure on the downstream side of the valve causes steam to pass into chamber 54 and thence through the valve stem clearance into chamber 64. The increase in pressure in chamber 64 causes an additional quantity of water to pass from chamber 64 through the clearance in guide 47 into water filled diaphragm chamber 65. The sum of the force of water pressure on diaphragm 50 in chamber 65 and the bias of the main valve spring 42 becomes greater than the force on the lower face of diaphragm 50 in chamber 41. This differential force causes the diaphragm 50 to move downwardly until a new equilibrium is established with the valve head now closer to the valve seat than it was initially. The reduction in the volume of chamber 41 causes some of the water to leave chamber 41 and to reappear in chamber 52. Any excess of water above the capacity of chamber 52 backs up control line 7 and is discharged through orifice 20 to chamber 54, where it may either enter chamber 64 or be expelled through standpipe 58.

I have thus provided a diaphragm operated control valve having a liquid operated diaphragm which responds much more rapidly than does the prior art steam actuated valve. I have found that a valve built in accordance with the present invention will stabilize from no load to full load in a matter of a few seconds as compared to a conventional valve requiring approximately one quarter of an hour.

By excluding steam from the diaphragm chambers, I have reduced the tendency of control valves to exhibit instability. The compressible steam present in the control valve diaphragm chambers of the prior art permits the diaphragm to fluctuate thereby causing the main valve to hunt. Since the water in the diaphragm chambers of my invention is incompressible, little or no diaphragm fluctuation is experienced. By selecting the size of orifice 57 and the clearance in guide bushing 47, I am able to provide flow restrictions for water which are sufficient to damp fluctuation of the diaphragm and yet are adequate to rapidly effect the needed changes of volume.

The advantages of the liquid actuated diaphragm of the present invention may be realised in controlling the flow of any condensable fluid. Where the fluid is of a corrosive nature, a liquid other than the condensate of the fluid may be employed in the diaphragm chambers.

The valve of the present invention, when provided with such liquid, is applicable to the control of gases which do not condense. For example, air or other gas may be controlled by the valve of the present invention with water or oil as the operating liquid.

It will be apparent that many modifications may be made within the scope and spirit of my invention and, accordingly I do not wish to be limited otherwise than as indicated by the terms of the appended claims.

I claim:

1. A valve comprising a main valve housing with inlet and outlet passages, a valve seat interposed between said passages, a valve head cooperating with said seat and having a valve stem, and a valve actuating unit responsive to gas pressure, said valve actuating unit comprising a diaphragm associated with said valve stem and partially defining an actuating chamber adapted to contain actuating liquid, a secondary chamber which serves as a liquid reservoir associated with said actuating chamber and in communication with actuating gas, and an actuating liquid conduit having a flow restricting connection between the actuating chamber and the liquid phase of the associated secondary chamber.

2. The valve as claimed in claim 1, wherein said diaphragm forms a partition between plural actuating chambers in communication with secondary chambers.

3. The valve as claimed in claim 2, wherein the actuating liquid is subjected to gas pressure controlled by a pilot valve.

4. The valve as claimed in claim 3, wherein the pilot valve controls the admission of fluid from the inlet side of said main valve to said secondary chambers in response to the fluid pressure on the outlet side of said main valve to thereby regulate the fluid pressure on said outlet side.

5. The valve as claimed in claim 3, wherein the actuating liquid is condensate of the fluid controlled by the valve.

References Cited

UNITED STATES PATENTS 3,099,431   7/1963   Ritter et al. _____ 137—489.5

ARNOLD ROSENTHAL, *Primary Examiner.*